Oct. 8, 1968 C. W. LIVINGSTON ETAL 3,404,460
EARTH MOVEMENT MEASURING APPARATUS
Filed Sept. 24, 1965 6 Sheets-Sheet 1

INVENTORS.
CLIFTON W. LIVINGSTON
BY ROSS W. LIVINGSTON

Van Valkenburgh + Lowe
ATTORNEYS

Oct. 8, 1968   C. W. LIVINGSTON ETAL   3,404,460
EARTH MOVEMENT MEASURING APPARATUS
Filed Sept. 24, 1965   6 Sheets-Sheet 3

INVENTORS
CLIFTON W. LIVINGSTON
ROSS W. LIVINGSTON
BY
Van Valkenburgh & Lowe
ATTORNEYS

INVENTORS.
CLIFTON W. LIVINGSTON
ROSS W. LIVINGSTON
BY
Van Valkenburgh + Lowe
ATTORNEYS Oct. 8, 1968  C. W. LIVINGSTON ETAL  3,404,460
EARTH MOVEMENT MEASURING APPARATUS
Filed Sept. 24, 1965  6 Sheets-Sheet 5

INVENTORS.
CLIFTON W. LIVINGSTON
BY ROSS W. LIVINGSTON

Van Valkenburgh + Lowe
ATTORNEYS

FIG. 21.

United States Patent Office 3,404,460
Patented Oct. 8, 1968

3,404,460
EARTH MOVEMENT MEASURING APPARATUS
Clifton W. Livingston and Ross W. Livingston,
both of P.O. Box 504, Georgetown, Colo. 80444
Filed Sept. 24, 1965, Ser. No. 489,872
11 Claims. (Cl. 33—125)

ABSTRACT OF THE DISCLOSURE

A string of tubing holds a perforated anchor sleeve at a desired point within a borehole. A string of rods moves a piston to force a settable anchoring material through the perforations. A gauge anchored to the bore at the mouth senses the earth movement at the anchored sleeve as transmitted by the rods or tubing. Alternatively, if the gauge is supported at the mouth of the bore by a second coaxial string of tubing extending to a second sleeve anchored at an intermediate point, the gauge will measure the relative movement of the two points.

---

This invention relates to apparatus and instruments for measuring internal rock and earth movements, a primary object of the invention being to provide a novel and improved apparatus for measuring such movements of enhanced sensitivity to rock movements, stability of calibration, reliability of measurement and versatility of application.

Another object of the invention is to provide such apparatus which is especially adapted to measure the relative movements of rock formation between the bottom or inner end of a borehole and the mouth of the hole, but is equally adapted to measure relative movements of rock formations between the bottom of a borehole and a selected intermediate location along the course of the borehole.

Another object of the invention is to provide novel and improved apparatus of the above character which is especially adapted for use in shallow boreholes, as well as boreholes of considerable depth, and is equally well adapted for installation in horizontal, vertical or upwardly or downwardly inclined boreholes to obtain earth and rock movement information, as in excavation or tunnelling operations, in earth packing operations or in concrete and like structures where measurement of movement of the structure is desired.

Another object of the invention is to provide novel and improved apparatus of the above character which is especially adapted to be used at locations where rock blasting is in progress, with the instrument being adapted to withstand and even to record, without altering its calibration and settings, shock effects of a blast, strain energy factors, material behavior effects and the like, as well as being substantially immune to possible damage from flying rock.

Another object of the invention is to provide such apparatus which protectively encases an extended gage rod from moisture and corrosive effects, from temperature effects and also from ordinary lateral shifting and caving movements of a rock structure along the course of the borehole, such as, for example, where shifting movements occur along a stratum or slip plane traversing the borehole.

Another object of the invention is to provide such apparatus which may be quickly, easily, precisely and solidly mounted and set within a borehole with a minimum of special operations and without the need for special equipment.

Another object of the invention is to provide such apparatus which embodies an improved anchoring arrangement for securing the components thereof within a borehole at any selected location, and improved and simplified arrangements for mounting and protectively housing a measuring or recording instrument thereof.

A further object of the invention is to provide an instrument particularly adapted for use in such apparatus and which may be utilized in recording the results of dynamic shock, transient wave effects or other rock or earth movements of short duration, as well as earth or rock movements of a creeping or relatively slow character, and which may also be utilized for visual indication of earth or rock movements of a relatively slow character.

Other objects of the invention are to provide, in such apparatus, a compact neat appearing, low cost, rugged and durable unit.

With the foregoing and other objects in view, all of which more fully appear hereinafter, our invention comprises certain constructions, combinations and arrangements of parts and elements as hereinafter described, defined in the appended claims and illustrated in preferred embodiments in the accompanying drawings, in which:

FIG. 10 is a condensed, vertical section showing the use of a modified form of the apparatus in measuring the effect of impacting operations on an earth fill or the like;

There has been a continuous and increasing need for better methods and apparatus to measure the movement of rock masses as the stress patterns within the mass change responsive to adjacent excavation or tunnel boring operations. Such information permits an evaluation of the strain and creep characteristics of rocks in their natural environment and, more important, an indication of the stability of the rock mass. In rock excavation, as in open pit mining, for example, the generally accepted principles of soil mechanics cannot be used accurately to predict a slope at which the sides of the pit may be unstable. Such is controlled by a combination of many factors. Instability is brought about generally by energy release as the initial state of stress within the rock mass is changed due to excavation or man-made loading. This results in moving and creeping actions of the rock and sometimes even spalling and cracking actions, all of which are inextricably complicated by stratigraphic and structural discontinuities of the rock formations. The same type of problem exists in man-made structures, such as in dam abutments, either during construction or subsequent thereto, as a result of fluctuations in pool level or of the change in shores, within the abutments or at the toe and base after the dam is built.

Regardless of the difficulty of accurately predicting the rock mass behavior by an analytical approach, important information bearing upon geologic defects, upon the existing rather than the assumed conditions, may be obtained by actual measurements of comparative movements of a rock mass, as between the surface and at a selected depth within the mass. Such movement may be observed during the course of an excavation operation and even for a long period of time afterwards.

One instrument proposed for such purpose is a borehole extensometer, such as the type set forth in the article entitled "Behavior of Materials in the Earth's Crust," in the Quarterly of the Colorado School of Mines, Vol. 52, No. 3, July, 1957 at pages 174–176. However, instruments of that type, though capable of producing considerable valuable information, have been generally unsatisfactory from the viewpoint of practical use. Such instruments are difficult to install and read. Moreover, they are difficult to protect where blasting is in progress adjacent to the borehole; thus, the instruments, for various reasons, cannot retain a proper calibration or setting, are not suitably protected against flying rock from an adjacent blast, and are not designed to include transient effects associated with blasting or impact loading.

To provide a better apparatus for actual field use, the present invention was conceived and developed and comprises, in essence, a rigid gage rod carried within a protective casing, an anchor held by the extended end of the casing and adapted to be cemented in the borehole to hold the inward end of the gage rod, and a compact instrument housing connected to the outer end of the casing and adapted to be placed within a recessed pocket of the mouth of the borehole. The outward end of the gage rod is within the housing and contacts a dial gage, a transducer, or other suitable electronic device, to indicate comparative rock movements between the anchor point and the measuring point, or to indicate the differences in rock behavior between the two points or the variation in wave form, seismic vibrations and thermal effects with distance. The basic structure and variations thereto will now be described in detail.

Figure 1:
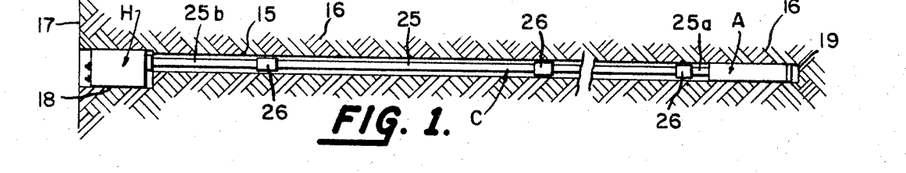
FIG. 1 is a diagrammatic, condensed, longitudinal sectional view of a borehole extending through a rock mass and apparatus mounted therein which is constructed according to the principles of the invention.

Referring more particularly to FIG. 1 of the drawings, a borehole 15 is drilled into a rock mass 16, as from a side 17 of a tunnel, drift or the like from the surface of a rock mass, or in general from the surface of a properly chosen point within the interior of a segment of the earth's crust, to any selected depth and at any selected pitch, either horizontally or sloping, or even drilled vertically, upwardly or downwardly. The borehole 15 is of a size easily drilled by conventional drilling equipment, such as a diameter of 2⅛ inches, which permits the components of the apparatus to be a size suitable for easy handling. To prepare the borehole, a shallow pocket 18, such as 4 inches in diameter and 12 inches deep, is formed at the mouth of the borehole to receive a cylindrical instrument housing H, hereinafter described. The pocket 18 is necessarily axially offset from the borehole 15 to permit proper fitting of the components and such offset drilling of the pocket 18 with respect to the borehole is conveniently accomplished by drilling the pocket first and then using a guide in the pocket to align the borehole drill.

The apparatus of this invention includes an elongated, cylindrical gage rod R which extends throughout the entire reach of the borehole. This rod is completely enclosed within a tubular casing C having an anchor A at its inner end, as at the bottom 19 of the borehole 15, and connecting with the instrument housing H at its outer end. This overall arrangement may be modified to include an additional intermediate anchor, supplemental casing members, and other appurtenances, such as a protective plug to encase the instrument housing within its pocket and a packing sleeve to hold the casing in place, all as will be hereinafter further described.

The gage rod R is a solid rod or a tube, such as about ½ inch in diameter, i.e. a size sufficient to be comparatively rigid and respond to very slight movements in a borehole of considerable depth. Such longitudinal rigidity is essential and the rod is preferably made of steel, or stainless steel if corrosion is anticipated. Also, it may be made of invar metal where temperature variations sufficient to affect the results of a reading are to be anticipated. Since the depth of a hole may be considerable, this rod is necessarily formed as a plurality of interconnected lengths 20. The lengths may be interconnected by collars, but preferably the rod lengths 20 are provided with a threaded socket 21 at one end and a threaded stub 22 at the opposite end, as in FIG. 2, the threads being of a type similar to well rod tubing, adapted to provide a tight made-up joint. The inward rod 20a extends into the anchor A and carries a piston 23 at its end within the anchor to effect setting operations, hereinafter further described. The outward rod 20b terminates within the instrument housing with its end formed as a flat, squared surface 24 adapted to contact a gage, as will hereinafter be described.

The tubular casing C consists of a plurality of tubular lengths 25, preferably conventional pipe lengths, which are threaded at each end are joined together by couplings 26 or by threaded connections integral with the pipe, to extend the full reach of the bore hole. The inward section 25a is connected to the anchor A and the outward section 25b is adapted to terminate within the instrument housing with the end portion 20b of the gage rod projecting therefrom. This gage rod portion is slidably held and centered in a bushing 27 in the end of the casing section 25b, or the end rod 20a may be provided with a coupling which functions in the same manner as bushing 27. It is to be noted that the casing C may be filled with grease or a similar protective lubricant.

The length of gage rod sections 20 and casing sections 25 conveniently used is, of course, limited for underground use by the width of the tunnel from which the borehole extends, since succeeding sections must be coupled to previous sections and the gage rod and casing moved into the borehole 15 in increments. Thus, a length of such sections of 10 feet is convenient for normal underground use, since they can be accommodated in wider or higher tunnels, although if the tunnel or other area from which the borehole extends is narrow or lower, as the case may be, shorter lengths should be used. For surface use, the length of gage rod sections 20 and casing sections 25 may be any length which can be handled conveniently, such as 20 to 22 feet. The borehole 15 may, of course, be anywhere from 25 or 30 feet to several hundred feet in length.

Figure 3:
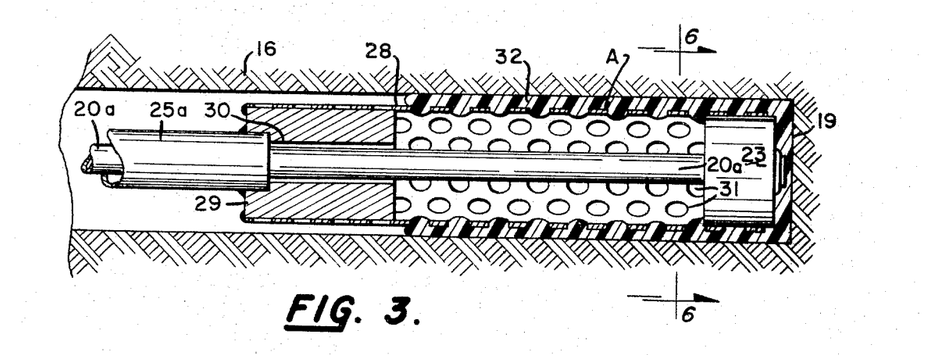
FIG. 3 is a fragmentary, enlarged portion of the borehole shown in FIG. 1 at its inner end or bottom, and a longitudinal, sectional view of an anchoring portion of the apparatus mounted therein.
Figure 4:
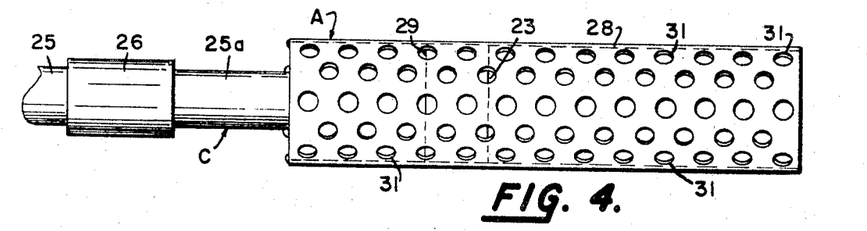
FIG. 4 is a side elevation of the anchoring portion of the apparatus shown in FIG. 3.

The anchor A, as in FIG. 3, includes a thin walled, reticulated, cylindrical sleeve 28 having one end closed by a plug 29, conveniently welded thereto, the plug 29 including an axially centered passageway 30 through which the end of gage rod 20a extends to hold the piston 23 within the sleeve, the diameter of the passageway 30 being such as to hold the end rod 20a with a free sliding fit. This passageway is also suitably countersunk for connection with the inner end of the inner casing section 25a, as by insertion of the latter in the countersunk hole and welding, as shown. The reticulations of the sleeve are preferably formed as an array of holes 31 distributed about the sleeve, as in FIG. 4.

Figure 6:
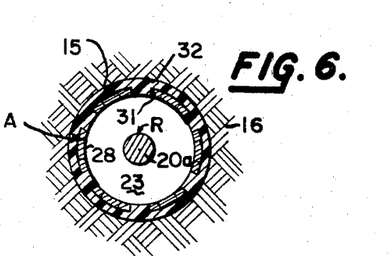
FIG. 6 is a transverse, sectional view, taken along the indicated line 6—6 of FIG. 3.

The diameter of sleeve 28 may be approximately ¼ inch less than the diameter of the borehole 15, depending upon the bonding agent and the length of the sleeve, and it is contemplated that the sleeve will be affixed to the rock structure adjacent to the bottom of the borehole, or at any other selected location, by a bonding agent 32. Such bonding may be accomplished with any type of suitable adhesive which requires a period of time to set up, sufficiently to complete installation of the apparatus. A preferred adhesive is a type of fast setting cement known commercially as "Sika Plug," which, before setting up, is in the form of a pasty, viscous mass which will flow under pressure. Thermal setting resins, properly proportioned for set time, may also be used, such as epoxy or polyester resins, although such resins may not be effective in wet conditions. To apply the cementing agent between the sleeve and the borehole wall, the piston 23 is initially seated within the sleeve against the plug 29. A charge of adhesive is then placed in the sleeve 28, so that after the sleeve is properly located in the bore hole, the piston 23 may be shifted to squeeze the adhesive out of the sleeve through the holes 31 in the wall of the sleeve. The piston 23 and plug 29 may, if desired, be provided with a threaded connection, as described in connection with FIG. 7. After the charge is placed in the sleeve, the gage rod sections 20 and the casing sections 25 are made up and, as each section is connected onto others, the string is pushed into the borehole until the anchor approaches its final position, preferably at the bottom or inner end 19 of the hole. The final gage rod section 20b and casing section 25b are cut to a proper length to fit into the housing, as hereinafter described, attached to the string, and the anchor is then positioned for setting. This is accomplished by simply pushing against or striking the gage rod R to move the piston through the sleeve 27 and thereby squeeze the bonding agent 32 through the holes in the sleeve and into the annular recess between the hole and the anchor sleeve, as in FIGS. 3 and 6. Not only does the adhesive secure the sleeve in place, but it also tightly locks the piston, for a certain amount of adhesive will flow back into the sleeve and about both sides of the piston.

Ordinarily, this anchor will be located at the bottom of the bore hole, and the charge of adhesive will be pushed against this borehole bottom in a manner which forces it to flow laterally through the holes in the sleeve to effectively fill the space between it and the rock, and to set up in any interstices of the rock at the borehole. However, where the anchor is to be located in the borehole some distance from the bottom of the hole, an end plate, not shown, may be secured to the cylindrical anchor sleeve so that all flow of the resin must be through the perforations in a lateral direction, to prevent the charge from being lost by simply pushing it into the hole beyond the anchor.

Figure 5:
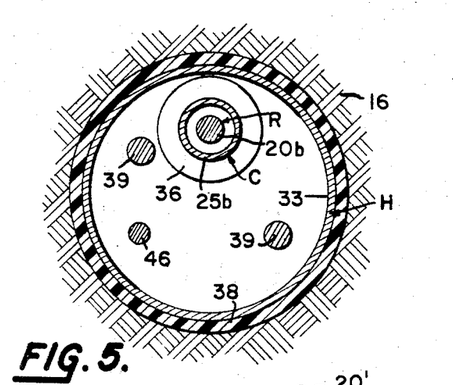
FIG. 5 is a transverse, sectional view, taken along the indicated line 5—5 of FIG. 2.

Once the anchor is set within the borehole with the casing and gage rod secured thereto and extended to the mouth of the borehole and into the pocket 18, the instrument housing H is set in position. The instrument housing H is formed as a can-like structure having a cylindrical wall 33 closed at one end by a transversely disposed base 34 which is integral with or welded or otherwise secured to the wall. A passageway 35 is formed at one side in the base, while a slide bushing 36 is mounted in the passageway to receive the end portion of the casing section 25b. The end of the casing within the borehole aligns the inner end of the housing while a radial array of adjustment screws 37 extend outwardly from the wall 33 near its outer end to facilitate aligning the unit within pocket 18. After the housing is placed in the pocket and aligned by the adjustment screws 37, it is anchored in position by injecting a bonding agent 38 into the annular space between the wall and the side of the pocket, as in FIGS. 2 and 5. This bonding agent may be of any material capable of being used for holding the housing in position and may be applied in any suitable manner, as by an injection gun.

Figure 2:
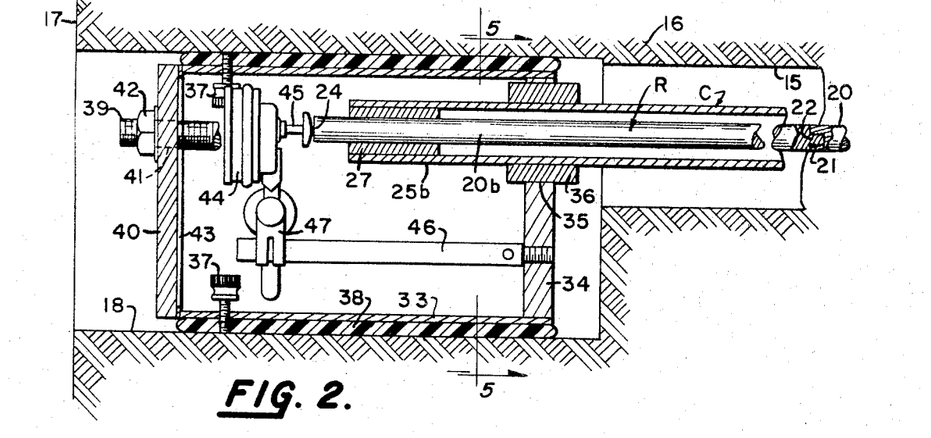
FIG. 2 is a fragmentary, enlarged portion of the borehole shown at FIG. 1 at its collar or mouth, and a longitudinal, sectional view of an instrument holding portion of the apparatus mounted therein.

The instrument housing H includes a pair of holding studs 39 which are mounted on the base 34 to extend through the housing to the opposite end thereof, to hold a disc-shaped cover plate 40 in place. This cover plate has a pair of holes 41 through which the studs 39 extend to receive holding nuts 42, to thereby tightly secure the plate to the housing, as illustrated in FIG. 2. The disc-shaped cover plate may be of a transparent plastic material to facilitate the reading of gages within the housing without the necessity of removing it, or it may be of metal where protection, such as against flying rock, is a more important consideration. Also, when a metal cover plate is used, it may press against a gasket 43 to provide a watertight seal for the housing wall 33.

As movement of the rock mass along the course of the borehole 15 occurs, to change the distance between the bottom of the borehole, where the anchor is located, and the mouth of the borehole, where the instrument housing is located, both the gage rod R and the casing C will normally move in unison into and out of the housing, since both are secured to the anchor A. During such movement, the casing will slide in the housing bushing 36. However, should a disturbance occur along the reach of the borehole, as where a cave-in occurs or a shifting of structure occurs as along a fault which jams the casing C, movement of the casing C may be prevented, but this will not prevent movement of the gage rod R within the casing C and movement of the end of the rod R into and out of the casing C and in the casing bushing 27. In either case, the true rock movement along the axis of the borehole can be easily measured by measuring the movement of the rod end 24 within the instrument housing with respect to the housing.

Figure 17:
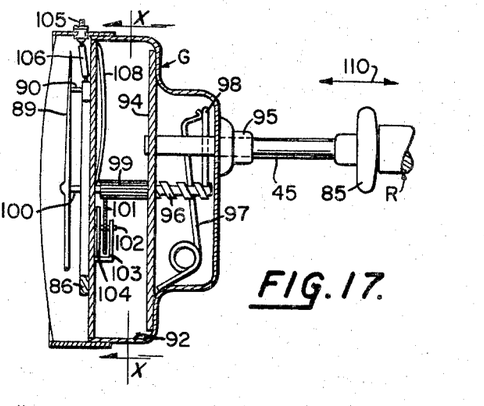
FIG. 17 is a longitudinal section of the gage of FIG. 16.

Instruments to measure the movement of the end 24 of the rod R within the housing may be of any suitable type, such as electrical or visual. A standard transducer system or other electrical or electronic system, not shown, may be mounted in the housing to measure the rod movements continuously or to record transient effects, such as the passage of a stress wave through the rock, as from an earthquake or underground atomic explosion, and such is especially desirable where blasting or other operations are creating shock waves or sudden movements in the rock mass. However, movement other than dynamically induced rock movement is usually a slow phenomenon, and an observation once a day, or even once a week, may suffice. Thus, visual observations are preferred, and very minute movements can be readily measured with an indicator dial gage 44 of any conventional type. Such dial gages include a spring, such as shown in FIG. 17, and an actuating finger 45 which is moved by the end 34 of the gage rod.

The dial gage 44 is conveniently supported by a mounting arm 46 outstanding from the base of the housing, in spaced parallelism with the axis of the gage rod. Mounting arm 46 carries an adjustable gage support bracket 47 which is adapted to hold the gage in position, with the reading dial facing the open end of the housing for easy reading, and with finger 45 being in alignment with the rod R. The bracket is also adapted to be adjusted along the mounting arm to permit the gage to be zeroed in before a test. The zeroing-in operation will ordinarily involve moving the dial gage to a position where the actuating finger is at an intermediate position and can be either extended or retracted by movement of the rod R, to register either increases or decreases of the distance along the course of the borehole.

Figure 7:
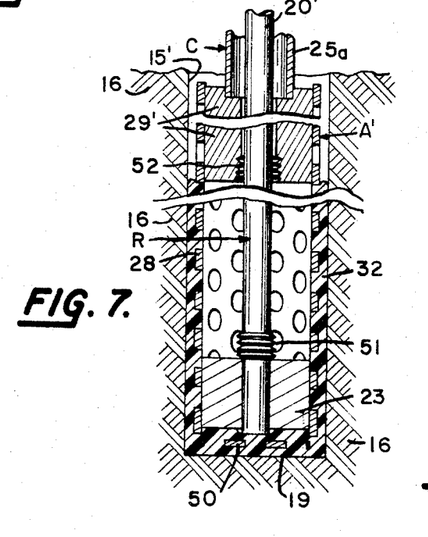
FIG. 7 is a condensed, longitudinal section, similar to FIG. 3 but taken at the bottom of a vertical or downwardly slanting hole and illustrating a modified construction of the anchoring portion of the apparatus.
Figure 8:
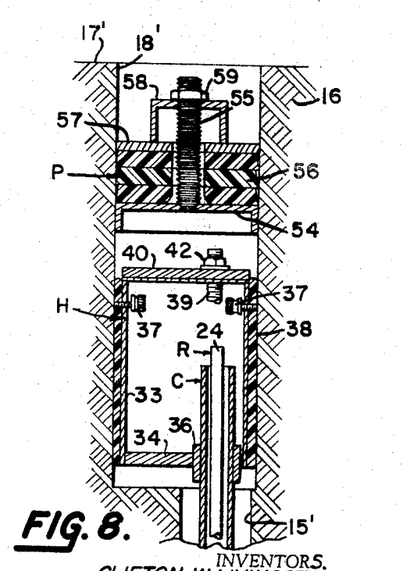
FIG. 8 is a fragmentary, longitudinal section, similar to FIG. 2 but on a reduced scale, with certain components within an instrument container being removed and taken at the top of a vertical or downwardly slanting hole, the view showing further a protective plug at the entrance of the borehole.

A number of modifications may be employed to facilitate using the apparatus at various locations. While the apparatus of this invention is more often used in horizontally extending boreholes, it is frequently used in a vertical borehole 15' of FIGS. 7 and 8, or one which slants sharply downwardly. Certain modifications embodied in the anchor A', illustrated in FIG. 7, are desirable to adapt the equipment for such use. A circular, apertured plate 50 is pushed against the lower end of the charge of adhesive, prior to insertion of the anchor downwardly into the hole, the diameter of plate 50 being such that the natural adherence of the cement, prior to setting will maintain the plate inside the sleeve and prevent the cement from dropping out of the sleeve as the casing and rod are being lowered into the borehole. Plate 50 will normally be extruded from the sleeve by piston 23 and against the bottom 19 of the borehole, when the piston is extended from its initial position adjacent to the plug at the head of the anchor. In lieu of plate 50, a thin wire mesh may be attached to the lower end of sleeve 28 to retain the resin in the sleeve, since pressure from piston 23 in extruding the adhesive from the sleeve will merely push some of the adhesive through the wire mesh.

A further modification embodied in anchor A', as in FIG. 7, includes a short threaded portion 51 on the gage rod 20' adjacent to the piston 23, which is adapted to be turned into a threaded socket 52 in the holding plug 29' in the anchor sleeve 28. With this arrangement, the piston cannot be accidentally moved by the weight of the gage rod while the casing and rod are being lowered into a vertical borehole, or a borehole which slants relatively sharply downwardly. Once the apparatus is at the bottom of the borehole, however, the gage rod may be simply rotated to release it from the threaded connection with the plug, and it can then be moved downwardly to extrude the bonding agent through the sleeve holes. If desired, the anchor A of FIGS. 3 and 4 may similarly be provided with threads on the gage rod at piston 23 and a threaded socket in plug 29, so that the piston will not be accidentally dislodged and the adhesive extruded prior to the anchor reaching the desired position in the borehole.

The setting up of housing H in a pocket 18' at the upper end of a vertical borehole 15' is substantially the same as that heretofore described; however, where such a vertical borehole is located in a tunnel floor 17' adjacent the head wall where considerable blasting is in progress, it is expedient to protect the housing from falling rock. In such an arrangement, as in FIG. 8, the modified pocket 18' may be increased somewhat in depth, over pocket 18 of FIG. 1, and a protective plug P may be placed therein.

Plug P includes a disc-like base 54 from whence an axially centered stud 55 upstands, while the base supports a plurality of expandable packer washers 56 which are positioned over the stud. A ring 57 and spacer 58 are placed upon the washers, and a squeeze nut 59 is turned onto the stud to compress the packer washers between the base disc 54 and ring 57. The resulting spreading of the washers locks the plug in the hole, as illustrated. It is to be noted that this protective plug may be used for boreholes having inclinations other than vertically downward.

Figure 9:
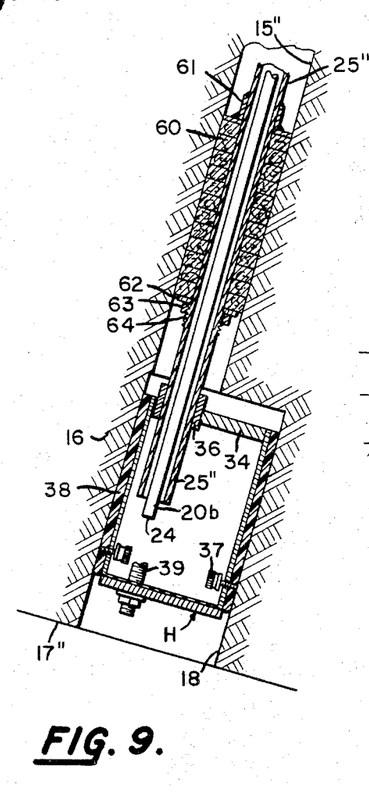
FIG. 9 is a fragmentary, longitudinal section similar to FIG. 8, but taken at the entrance of an upwardly slanting borehole, the view showing further a retainer packer used to hold the apparatus in position as it is being installed.

A further modified arrangement shown in FIG. 9 illustrates the apparatus installed in an upwardly inclined, nearly vertical borehole 15". In this arrangement, a casing and a gage rod, lower end sections 20b and 25", respectively, of each being shown, are fastened in borehole 15" by an anchor similar to anchor A of FIGS. 3 and 4, and extend into an instrument housing H substantially the same as heretofore described. However, before the anchor may be secured and the instrument housing bonded in place in the borehole, it is necessary to support the apparatus, so that it will not fall out of the borehole. This is accomplished by a packer having expandable rings 60 which are mounted on modified outer casing section 25" adjacent to the instrument housing. The packer rings 60 abut a collar 61 secured, as by welding, to the casing section 25" at the upper or inward end of the packer, rings 60 being adapted to expand when under pressure. A washer 62 abuts the lower or outward end of the rings, so that a lock nut 63 engaging a threaded portion 64 of the casing may be turned against the packing rings to tighten and spread the rings.

Figure 10:
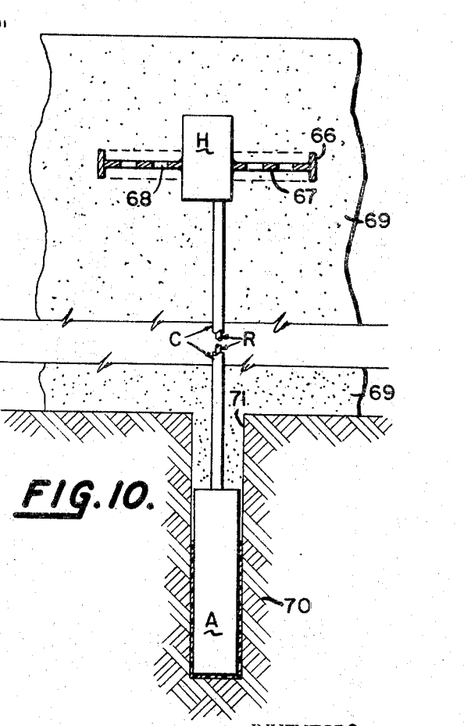

The modified construction illustrated in FIG. 10 is particularly adapted to be utilized in measuring the amount of settling or packing material, such as an earth fill, or a dam, but is similar to the apparatus previously described, except principally that instrument housing H is installed at the center of a heavy ring or flange 66, being connected thereto by a web 67 having holes 68 therein. Ring 66 and instrument housing H are buried in the soil or earth 69, with casing C and gage rod R extending downwardly to anchor A, which is anchored in bed rock 70, as in a shallow borehole 71. As the loose earth 69 is compacted, ring 66 and housing H along with it, will move downwardly. During compacting, the material being compacted can move through holes 68, to equalize the compacting within and without ring 66. The location of housing H will, of course, have been made of record by survey, so that when compaction is believed to be sufficient, a small excavation can be made to uncover the instrument housing and the actual downward movement can be determined. Compaction is preferably accomplished in successive layers, so that each can be measured, with housing H and ring 66 moved upwardly from each layer. Or, the instruments can be removed and housing H and ring 66 left in place. Then, additional length is added to casing C and gage rod R and another ring and housing placed in the next layer above, with the instruments replaced in the new housing. Since housing H will move downwardly, during compaction, in the event this movement is expected to be relatively large, such as one inch or more, a different type of dial gage 44, adapted to measure such movement, should be used. Also, bushing 36 of FIG. 2 should be made considerably longer, while bushing 27 may be replaced by a machined coupling, threaded on the inside for attachment to the last gage rod section and provided with a plug to contact the gage. When another section of gage rod is to be installed, it is merely screwed into the coupling.

Figure 11:
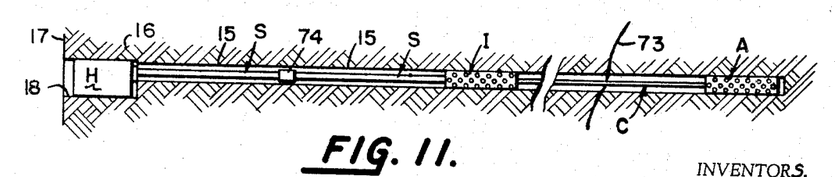
FIG. 11 is a diagrammatic, condensed, longitudinal section of a borehole extending through a rock mass, similar to FIG. 1, but with the rock mass being rendered discontinuous by a fault plane traversing the borehole and showing a modified embodiment of the apparatus incorporating intermediate and bottom anchors positioned on opposite sides of the fault plane.

The apparatus of FIG. 10 can also be installed in an oblique position in the side of an earth fill or similar type of dam, to determine the orientation of potential slide planes, differential measurements in the dam core or the like. The apparatus can also be used to measure elastic deformation in ice, as by freezing anchor A in the inner end of a bore in the ice and freezing ring 66 in place at a position spaced therefrom. A further modified construction, shown generally in FIG. 11 and details of which are illustrated in FIGS. 12 through 15, is especially adapted to provide measurement of relative movement of rock structure between two locations within a borehole, one location at the bottom of the borehole, using the anchor A hereinbefore described, and the other at a selected intermediate location, using the intermediate anchor I. This arrangement is especially useful where a fault plane 73 is known to exist, for the bottom anchor A may be positioned on the remote side of the fault plane and the intermediate anchor I positioned on the near side, with respect to the mouth 17 of the borehole 15, as illustrated in FIG. 11. The anchor A is connected to a gage rod R the same as hereinbefore described, while the gage rod is enclosed within a casing C, the same as hereinbefore described, except for a slight modification of the section 25c at the location of the intermediate anchor I. Also, the gage rod R and the casing C terminate inside a housing H, substantially the same as that hereinbefore described, while a short portion of the gage rod 20b extends from the casing end section 25b to provide a butt end 24 which contacts the finger 45 of the dial gage 44, as in FIG. 12.

The housing H is rigidly connected to one end of an outer casing sheath S, formed of sections attached together in a suitable manner, as by couplings 74. The opposite end of sheath S is attached to the intermediate anchor I, so that the housing moves with movement of the intermediate anchor I to correspond precisely to the position of that anchor. Accordingly, the housing H shown in FIG. 11 is not bonded in the pocket 18, but is slidably suspended in the pocket 18 in any suitable manner, not shown. It follows that movements registered by the dial gage 44 will be the comparative movement between the gage rod R and the sheath S, with which the housing moves. Since a substantial portion of such movement will occur between the casing C and the sheath S, the space between these tubular members may be filled with a protective lubricant and the casing C is supported in a slide bushing 75 at the end of the sheath in the housing, as in FIG. 12.

Figure 13:
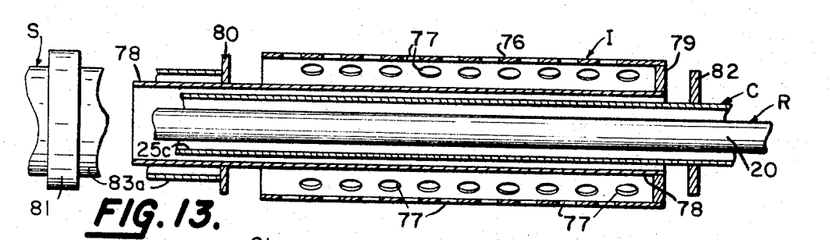
FIG. 13 is a fragmentary, condensed, longitudinal section of the apparatus of FIG. 11 at the position of an intermediate anchor and with the components of the intermediate anchor being longitudinally separated to better illustrate their construction.
Figure 14:
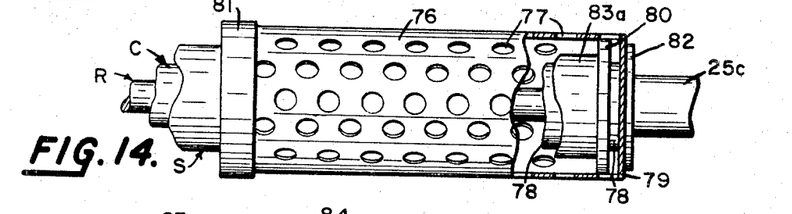
FIG. 14 is a side elevation, partly broken away, of the intermediate anchor of FIG. 13, with the parts in position as they will appear after installation in a borehole, but omitting the cementing agent and borehole for clarity of illustration.
Figure 15:
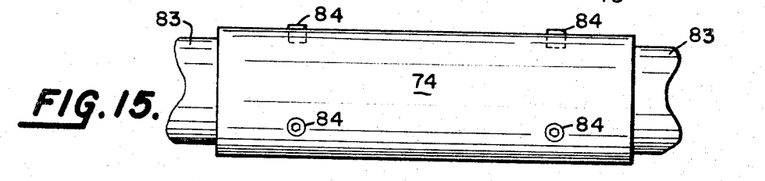
FIG. 15 is a side elevation of a coupling utilized for attaching adjoining sections of an outer sheath.

The intermediate anchor I, as in FIGS. 13 and 14, includes a sleeve 76 reticulated by an array of holes 77 therein. This sleeve has substantially the same construction and diameter as the sleeve 28, heretofore described. The anchor I also includes a guide tube 78 which is adapted to fit over the casing C with a loose sliding fit and is connected to the sleeve 76 by an end ring 79 at the inward end of these members, as by welding, thereby providing a space between the sleeve 76 and guide tube 78 to receive a ring piston 80. The inward movement of ring piston 80 may be limited by an abutment ring 81 mounted on sheath S engaging sleeve 76, so that ring piston 80 will approach but will not abut against end ring 79 of sleeve 76. Intermediate anchor I is positioned upon the casing section 25c at its proper selected location within the borehole by an abutment flange 82 which is welded or soldered onto the casing section 25c. Thus, the intermediate anchor I may be pushed inwardly into the hole until its ring end 79 abuts against the abutment flange 82.

Figure 12:
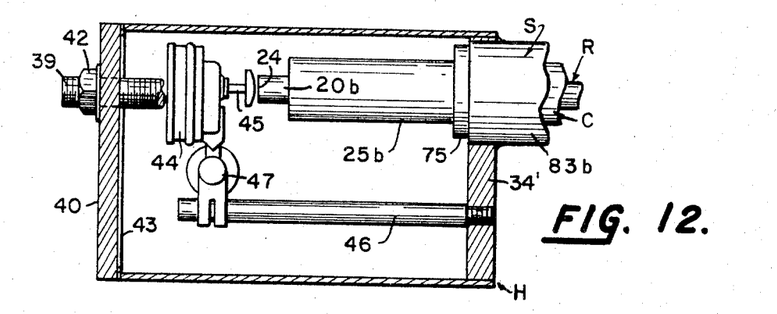
FIG. 12 is a fragmentary, longitudinal section of the instrument holding portion of the modified apparatus of FIG. 11.

The sheath S is formed of a plurality of tubing sections 83 including a section 83a of FIG. 13, which normally extends into the sleeve 76 and an outward section 83b of FIG. 12, which is attached to the instrument housing H, as by welding. These sections of sheath S may be interconnected by couplings 74, as indicated previously, one coupling 74 being shown in FIG. 15. Couplings 74 are preferably snug fitting, sleeve-type couplings having lock screws 84 to effect a tight connection, the sleeve-type coupling being particularly desirable where the sheath diameter is nearly as great as the borehole diameter.

The inward end of the sheath section 83a terminates in ring piston 81 which is attached thereto, as by welding, and is adapted to surround the guide tube 78 of the anchor I and slide into the sleeve 76. With this arrangement, the intermediate anchor I is secured in position in a simple manner. A bonding charge is placed in the annular space within the sleeve, about the guide tube 78, and as the respective components are pushed to position within the hole, the ring piston 80 is carried on the tube 78 but just inside the sleeve 76. When the strings of casing are properly located and the end anchor A positioned and set, the intermediate anchor I is pushed home against the abutment flange 82. Then the ring piston 80 on the sheath S is pushed further into the sleeve 76 to extrude the bonding charge outwardly and laterally through the holes 77 until the ring piston 80 comes to rest near the end ring 79, as illustrated in FIG. 14, when the outer abutment ring 81, attached to sheath section 83a, as by welding abuts the end of sleeve 76. Upon setting, this bonding charge not only holds the sleeve in the borehole, but it also holds the ring piston 80 in a tightly locked position within the sleeve.

If the fault 73 causes a further separation of the anchors A and I, the casing C and rod R will move through the intermediate anchor I, with the abutment flange 82 separating from its contact with the end ring 79 and it is anticipated that such will be the normal movement encountered. However, where movement is in the other direction (a condition not likely to occur in normal practice), the end ring 79 may move against the abutment flange 82 with considerable pressure. If such movement is anticipated, the resulting compression may be avoided by securing the flange 82 on the casing section 25c with a soft solder, so that whenever a predetermined pressure is exceeded, the abutment flange 82 will be sheared loose from the casing section 25c. Of course, both inner anchor A and intermediate anchor I remain bonded to the rock 16, so that measurement of relative rock movement is not impaired by shearing of flange 82 from casing C. As will be evident, fault line 73 may instead represent the interface between rock and concrete, as in a foundation, dam or the like, while the previously described constructions may also be utilized in measuring relative movement between rock or other earth structure and concrete or the like, such as a foundation, dam or the like.

Figure 16:
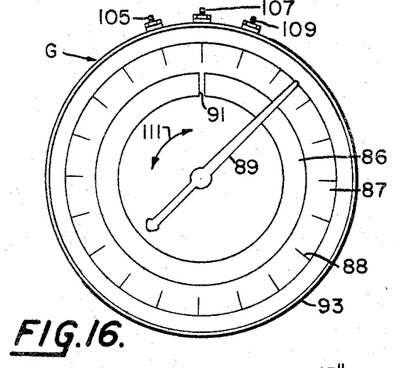
FIG. 16 is a front elevation of a single revolution dial gage equipped with a resistance ring, for measuring electrically and indicating, as at a remote point, the gage move.

The gage rod of the previous embodiments may, instead of contacting the finger 45 of a mechanical gage, contact button 85 of a similar finger 45 of a combination mechanical-electrical gage G of FIGS. 16 and 17, similarly to convert linear displacement to angular displacement. The mechanical displacement is converted to an electrical measurement by means of a circular resistor 86, as of carbon, fixed on a dial plate 87 having a scale 88 thereon, such as calibrated to read 0.001 inch increments of movement of the gage rod R, indicated by an indicating arm or needle 89 having a slide pin 90 affixed thereto for electrical contact with resistor 86. The latter is provided with a small gap 91, at the zero position of scale 88, so that as pin 90 moves toward or away from gap 91, the resistance varies as the angular displacement of the mechanical dial varies. Dial 87 is mounted in a conventional housing 92, to which a bezel 93 carrying a conventional glass face plate (not shown), is attached at the front, and an inner support plate 94 is attached on the inside, as at the position shown in FIG. 17. Finger 45 is guided by a bearing 95 at its entrance into the rear of the housing, while a guide hole for finger 45 may also be provided in plate 94. Finger 45 carries a worm pin 96 which bears at its upper end against a leaf spring 97 and at its lower end against the threads of a worm screw 98, mounted for rotation in the rear of housing 92 and in plate 94 and also connected to a pinion 99 and a shaft 100, on the latter of which indicator needle 89 is mounted. Pinion 99 engages a gear 101, mounted on a pivot pin 102 which, in turn, is pivotally mounted in dial plate 87 and an angular bracket 103, with the latter conveniently attached to the rear side of dial 87, while a coil spring 104 is connected to the pivot pin 102 for gear 101, as shown. Gage G is also provided with an insulated terminal 105, to which one end of resistor 86 is connected, as by a wire 106, while a second insulated terminal 107 of FIG. 16 is connected by a wire 108 of FIG. 17 with shaft 100 and thence needle 89 and slide contact pin 90. A third insulated terminal 109 may be connected to the opposite end of resistor 86 by a wire similar to wire 106, for a purpose described later. The gage rod may, under particular circumstances, be moved in either direction, as indicated by the double arrow 110 of FIG. 17, resulting in a movement of needle 89 in a corresponding direction, as indicated by the double arrow 111 of FIG. 16.

As will be evident, electrical current passes through electrical terminal 105 and insulated wire 106, thence to the carbon resistor 86. Current through the resistor varies, depending upon the linear displacement of the gage rod and upon the associated angular displacement of the combination dial indicator-electric contact arm or needle 89, to which is attached the slide contact pin 90. From the carbon or equivalent resistor, the current flows through the indicator needle and hence to a common ground and to the recording and calibrating circuit. The resistor 86 is, of course, insulated so as to prevent short circuiting of the current.

Figure 18:
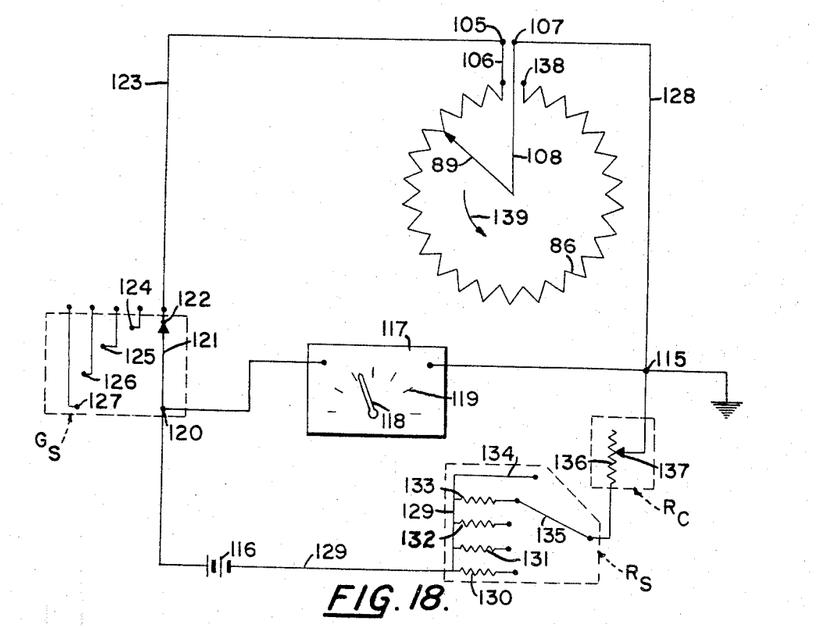
FIG. 18 is a circuit diagram for the gage of FIG. 16.

In the circuit diagram of FIG. 18, the resistor 86 and needle 89 are indicated diagrammatically, as well as other parts, such as gage G, indicated in block fashion in dotted lines. The circuit also includes a common ground connection 115 and a power source, such as a battery 116. In general, the power source causes the current to flow through the resistor, then through recording and calibration circuits, which include means for calibrating the gage, means for varying the current, electrical means for changing the gage sensitivity, and means for adapting the circuit to both loading and unloading type motion of the gage rod. Current flowing from the power supply is divided, as desired, into a first portion that passes through the circular resistor 86 and a second portion that passes through the electrical recording and calibrating circuit, which includes a meter 117 having a needle 118 and scale 119, for which a recorder may be substituted. One side of the meter is connected to ground connection 115 and the opposite side of the meter is connected to a common terminal 120 for a selector switch 121 of a gage selector $G_s$, which, as shown, is turned to a contact 122 which is connected by a wire 123 to terminal 105 of gage G. As will be evident, switch 121 may be turned to any of the remaining contacts 124, 125, 126 or 127 of the gage selector, for connection to other gages whose reading is to be taken and each of which is connected to the corresponding contact by a wire similar to wire 123. Accordingly, one recording-calibrating circuit may serve any desired number of gages.

Terminal 107 for needle 89 is connected to common ground 115, as by a wire 128, while terminal 120 is connected with one side of battery 116, as shown. The opposite side of the battery is connected to a meter range selector $R_s$ by a common lead 129 for a series of resistors 130 through 133, and an extension 134 of lead 129, each of which is provided with a contact for selective engagement by a switch 135. In turn, switch 135 of the meter range selector $R_s$ is connected to a meter calibrating resistor $R_c$, comprising a variable resistor 136, the adjustable contact 137 of which is connected to common ground 115.

In operations usually encountered primarily in rock mechanics, and occasionally also in soils capable of storing and releasing stored potential energy, the major displacement is due to elastic rebound, in which a volume increase of the rock or soil occurs. For this reason, displacement of the gage rod R of FIG. 17 is such as to unload the spring 97 which forces the contact button 85 against the gage rod. Accordingly, the principal displacement normally encountered is one in which the distance between the mechanical-electrical dial gage and the bottom-hole rod anchor is increased. This principal displacement may occur as the result of stress relief, thermal expansion of the rock mass, or of static or dynamic elastic rebound. It may occur also as a result of a dynamic shock travelling through the rock or earth and striking the rock free-face to which the gage housing is bonded. Regardless of the cause, any displacement in which the distance between the gage anchor and the gage housing increases is referred to here as an "unloading-type" displacement. Spring 97 serves as a means of protecting the gage against dynamic shock, because the displacement of the gage housing due to the shock relieves the spring tension. Unloading of spring 97 is accompanied by a similar release of tension in needle damping spring 104. Hence, the gage is protected against dynamically induced shock, both by unloading-type linear displacement of spring 97 and unloading-type angular displacement of needle damping spring 104.

In order that springs 97 and 104 may be unloaded by a transient shock wave, the mechanical-electrical type gage is calibrated and installed in the rock or earth in the spring-loaded position. Springs 97 and 104 are tensioned and the combination dial-indicator electrical contact arm or needle 89 thereby rotated, so as to permit maximum gage travel for the unloading-type of measurement that normally occurs. Hence, the electrical circuit, the mechanical design of the gage-spring mechanism, the method of gage installation and calibration are such as to permit continuous measurements of deformation indicative of any changes in earth stability, while also providing protection against shock and permitting major displacement of the gage rod in the direction in which the earth or rock stability decreases. Permanent displacement cannot occur in the opposite direction, in opposition to inertia of the mass of the earth, and does not occur in association with the passage of a shock wave through the medium. Thus, the construction of the gage, the method of calibration and the manner in which the gage is installed with the gage housing at the free-face and with the gage anchor fixed at a remote point closer to the center of mass of the material, differ fundamentally in principle from devices of the extensometer type.

The mechanical-electrical dial gage and the associated resistor circuit are first calibrated at full deflection in the completely spring-loaded position. Referring to FIG. 18, combination dial indicator electrical contact or needle arm 89 first is rotated to one end of the resistor, i.e. the point of connection to wire 106, where minimum current flows through the carbon resistor. Next, the spring 97 is unloaded to its "zero calibration position" and in doing so finger 45 is extended to its maximum unloading travel position. At this position, contact arm or needle 89 rotates counterclockwise to the opposite end 138 of the resistor, i.e. in the direction of arrow 139 of FIG. 18. Then, the meter or recorder needle is adjusted to a zero reading, using the calibration resistor $R_c$ to adjust the electrical resistance through the meter portion of the electric circuit, with current flowing clockwise from point 138 to wire 106, through the resistor with maximum resistance to flow. During calibration as above described, switch 135 of the meter range selector $R_s$ is preferably set on the contact for lead extension 134, so that the electric current passes through that portion of the meter range selector offering least resistance. The calibration thus is accomplished at maximum recording sensitivity.

For maximum recording sensitivity and minimum resistance through the meter range selector, the electric circuit may be designed, for example, so that full range deflection of the meter or recorded needle represents a total deformation of $\frac{1}{1,000}$ inch between the rod anchorage and the gage housing. Hence, a needle deflection of one division on an electric meter divided into 100 parts, rather than 10 parts as in FIG. 16, would represent $\frac{1}{100,000}$ inch gage deformation. Assuming the rock strain, for simplicity of illustration, to be linear between the anchor and the gage housing and that the distance between the gage housing anchorage and the gage rod piston anchor is 30 feet, a deflection of one division on the electric meter would represent a maximum rock strain measuring sensitivity of $\frac{1}{30}$ of a micro-inch per inch. Thus, the portion of the gage rock strain measuring sensitivity attributable solely to the electric circuit may be reduced by factors of 10 or other convenient multiples, using suitable resistances and selector switches. Thus, the resistances 130 through 133 of FIG. 18 indicate an arbitrary number of four such circuits, each of any convenient reducing factor, such as representative of reducing factors of 10, $10^2$ and $10^3$, which successively increase the movement of the meter or recorder needle for a unit movement of the dial gage arm 89. It will be understood, of course, that increase in sensitivity of the meter or recorder will reduce the range of movement which the meter or recorder will accommodate, except when a repeating recorder is utilized, which automatically returns to one side of the chart when it goes off scale on the opposite side.

Similarly, the gage sensitivity attributable to the design of the combination mechanical-electrical dial, or to the length between gage housing and gage anchorage, may be modified in accordance with the nature of the problem. For example, consider the reduction of gage strain measuring sensitivity attributable to the electric circuit with four selector switches. Using three reducing multiples of 10, the electrical gage sensitivity can be reduced by $10^3$. Hence, full scale deflection of the meter with the current passing through the maximum resistance of the three reducing multiples would represent a total deformation of one inch. It would be necessary, in this instance, to use a dial indicator having a travel not less than 1 inch.

Using various combinations of electrical, mechanical and gage length changes, the sensitivity of the gage may be varied widely. For most stability applications in rock mechanics, a total gage deformation of 1 inch is sufficient. However, for stability applications in soil mechanics, a deformation of 10 to 20 inches might be required. Moreover, measurements of displacement of the loading type, rather than of the unloading type, might be desired. For example, when measuring compaction of a large rock-fill or earth-fill dam, settlements during construction and compaction of the fill of between 10 to 20 inches may occur. For such applications, range switches with larger multiplying factors might be chosen and the number of range selector switches reduced. It would be necessary also to choose a dial capable of measuring large travel distances.

Referring to FIGS. 16 and 18, the direction of current flow through the resistor may be altered, should the field application deal primarily with a loading-type deformation, rather than unloading-type deformation. The direction of current flow through the resistor is changed for loading-type measurements by connecting the wire from the power source to terminal 109, rather than to terminal 105, and connecting the former to end 138 of resistor 86 of FIG. 18. The effect of changing terminals is to cause a loading-type deflection to register on the meter or recorder in the same manner as an unloading-type deflection. The change controls the direction of displacement of the needle of the electrical meter, but does not influence the magnitude of the deformation. However, the calibration for zero meter scale deflection must be made with the gage finger 45 partly extented and the tension partly released from spring 97.

Although primarily loading-type applications cannot be classed as earth stability measurements, design characteristics of the gage permit more accurate measurement of in situ strength, elastic and plastic properties of materials of the earth's crust than are possible using extensometer or load-cell devices which cannot be installed prior to change of the initial stress state. By proper techniques of installation and calibration, both the unloading deformation from the initial state of stress and the loading deformation to return to the initial condition, or beyond, may be observed.

The above discussion has dealt primarily with remote control and periodic readings of gages, certain applications of which have been discussed in connection with details of construction and calibration of the gage meter, rather than of the meter of a continuous recording device. In such applications, the deformation occurring as a result of an event or series of events after installation and calibration of the gage, may be of primary inerest. For measurements of dynamic loads where a complete record of an event, rather than periodic measurements, is desired, the electrical meter may be replaced with a continuous recording device at the same position in the electric circuit. If the gage is intended primarily for use in explosion or vibration research, the mechanical-electrical gage may be replaced by a transducer, and means for damping vibrations of the gage rod are preferably provided.

Figure 19:
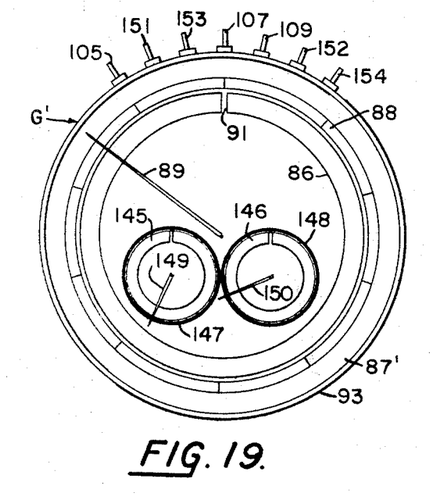
FIG. 19 is a front elevation of a multiple scale dial gage equipped with multiple resistance rings for extreme sensitivity.
Figure 20:
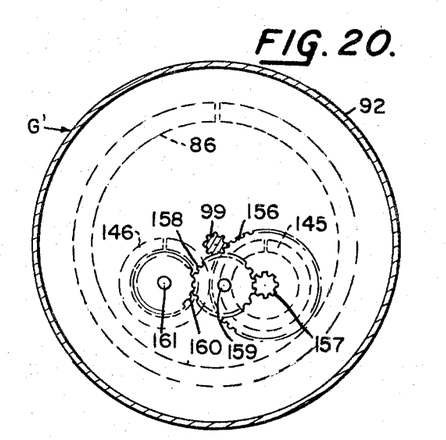
FIG. 20 is a transverse section taken medially of the multiple scale dial indicator of FIG. 19, from behind and looking toward the dial face at a position corresponding to the line X—X of FIG. 17.

For measurements of travel beyond the limits of a single revolution dial, the multiple dial gage G' of FIGS. 19 and 20 may be utilized, it being noted that FIG. 20 is taken along a section line corresponding to line X—X of FIG. 17. The gage G' is similar in numerous respects to gage G, except that the length of travel of its finger 45 is, for instance, five inches rather than one inch. Thus, gage G' is provided with a resistor 86 having a gap 91, a dial 87' having a scale 88 and a needle indicator 89 having a slide pin in contact with resistor 86 and similar to slide pin 90 of FIG. 17. Gage G' is also provided with a terminal 105 connected to one end of resistor 86 and a terminal 107' connected to needle 89, as well as a terminal 109 adapted to be connected to the opposite end of resistor 86. In addition to resistor 86, resistors 145 and 146 are also mounted on dial 87', within scales 147 and 148 and associated with needle indicators 149 and 150, respectively. Needle indicators 149 and 150 carry slide pins similar to slide pin 91 of FIG. 17, for engaging the respective resistors 145 and 146, while the needle indicators 149 and 150 and the slide pins carried thereby are each connected to terminal 107'. Indicators 149 and 150 and resistors 145 and 146 operate similarly to needle 89 and resistor 86, except that scales 147 and 148 have different full scale readings. For instance, scale 147 may have a full scale reading of one inch and scale 148 a full scale reading of five inches, with scale 88 having a full scale reading of one-tenth inches, which may be interpolated through the electrical circuit to increments of $10^{-1}$, $10^{-2}$, $10^{-3}$ or $10^{-4}$ inches, as desired. Gage G' may also be provided with a terminal 151 connected to one end of resistor 145 and a terminal 152 adapted to be connected to the opposite end of resistor 145, as well as a terminal 153 connected to one end of resistor 146 and a terminal 154 adapted to be connected to the opposite end of resistor 146. As in FIG. 20, the shaft for needle 89 is connected to a pinion 99, in a manner similar to that shown in FIG. 17, but pinion 99 also drives gearing for turning needles 149 and 150. Thus, pinion 99 engages a gear 156 which turns needle 149 and simultaneously therewith a pinion 157, which engages an idler gear 158 mounted on an idler shaft 159 and in turn driving a gear 160 which turns needle 150 through shaft 161. Due to the engagement of pinion 99 with gear 156, needle 149 will rotate in the opposite direction to needle 89, while needle 150 will rotate in the same direction as needle 149, due to the interposition of idler gear 159. The various gears and pinions shown in FIG. 20 are mounted on the rear side of dial 87', or on an appropriate bracket, with an appropriate shift in the position of bracket 103 for gear 101 and coil spring 104 of FIG. 17 to the inside supporting plate 94. For clarity of illustration, the resistors 86, 145 and 146, mounted on the front face of dial 87', are indicated in dotted lines in FIG. 20.

Figure 21:
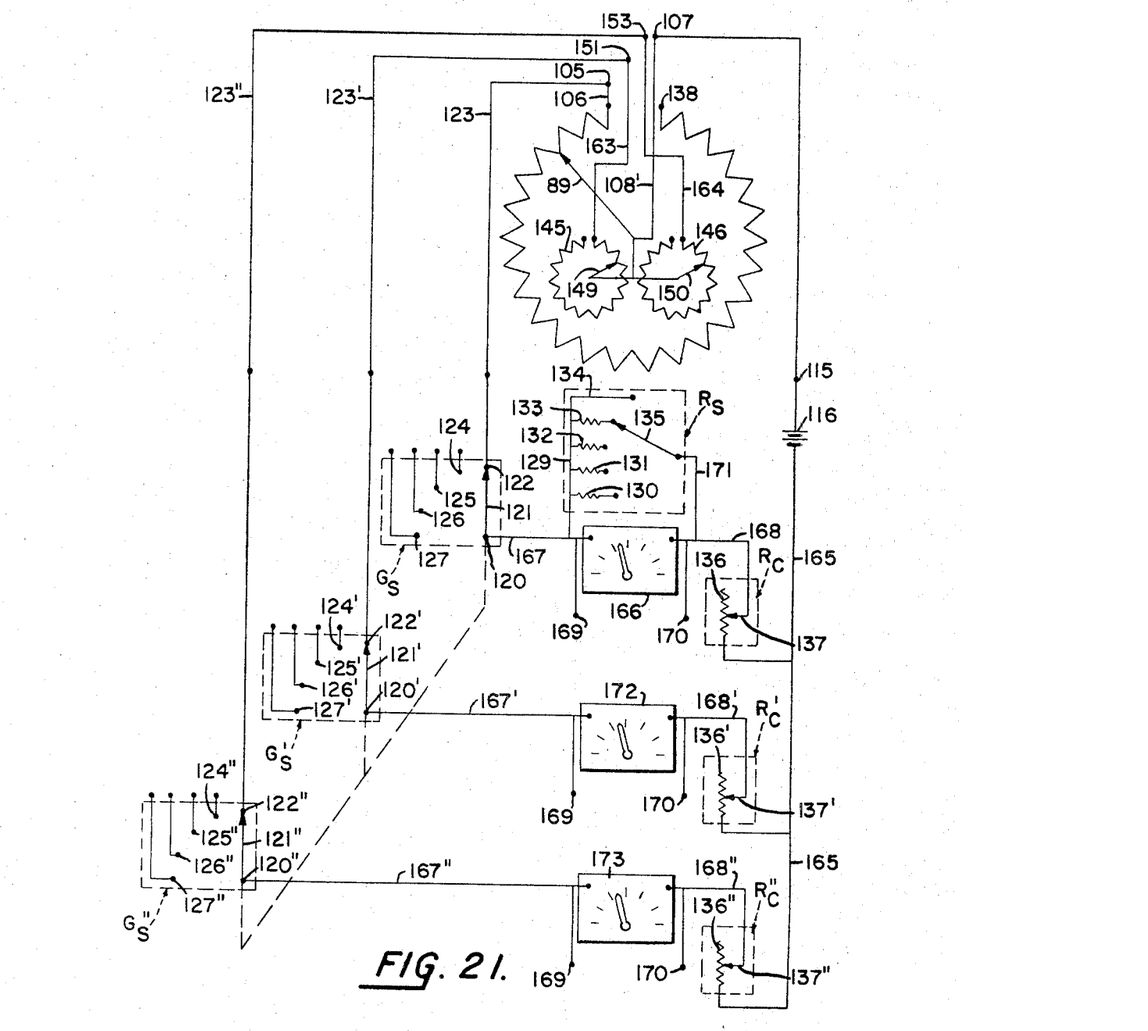
FIG. 21 is a circuit diagram for the gage of FIG. 19.

In the circuits shown in FIG. 21, terminal 105, as before, is connected to one contact 122 for switch 121 of gage selector $G_s$ by a wire 123, while terminal 107', which is connected to each of needles 89, 149 and 150 by a wire 108', is connected by a wire 128 to common ground 115, on the ground side of battery 116. Similarly, terminal 151, connected to one end of resistor 145 by a wire 163, is connected by a wire 123′ to a contact 122′ of a gage selector $G_s'$, shown as engaged by a switch 121′, while terminal 153, connected to one end of resistor 146 by a wire 164, is connected by a wire 123″ to a contact 122″ of a gage selector $G_s''$, shown as engaged by a switch 121″. The other contacts of the respective gage selectors are connected to corresponding terminals of other gages, while the switches 121, 121′ and 121″ are ganged together, as indicated, so that they will be switched simultaneously to the correct contacts for the respective gages. A common lead 165 extends from the opposite side of battery 116 to three calibration resistors $R_c$, $R_c'$ and $R_c''$, having variable resistances 136, 136′ and 136″ and movable contacts 137, 137′ and 137″, respectively. One terminal of a meter 166, similar to meter 117 of FIG. 17, is connected to switch 121 by a wire 167 and the opposite terminal to movable contact 137 of calibration resistor $R_c$ by a wire 168. Recorder terminals 169 and 170 are connected to wires 167 and 168, respectively, so that a recorder may be substituted for the meter. The range selector $R_s$ for meter 166 is similar to the range selector $R_s$ of FIG. 18, as indicated by corresponding part numbers, but in FIG. 21 is connected across the meter 166 or recorder, when used, by wire 129 and wire 171. Meters 172 and 173 are respectively connected at one terminal to switch 121′ and switch 121″, respectively, and at the opposite terminal to the movable contact of calibration resistors $R_c'$ and $R_c''$, respectively. Recorder terminals 169 and 170 are provided at each of meters 172 and 173, to permit the connection of a suitable drum type or moving paper and pen recorder, to be connected in the circuit for any one or all of the meters, so that continuous readings may be obtained. The meters 166, 172 and 173 may be individually calibrated in the manner described above for meter 117 of FIG. 18, while the range selector $R_s$ for meter 166 is utilized in essentially the same manner as range selector $R_s$ for meter 117, as described previously. As will be evident, through suitable selection of resistances in range selector $R_s$, indications of movement of the gage rod of as little as $10^{-5}$ inches may be detected or recorded, while with meters 174 and 175 or corresponding recorders, indications of movement of up to five inches may be detected or recorded.

From the foregoing, it will be evident that this invention fulfills to a marked degree the requirements and objects hereinbefore set forth. Not only is the apparatus versatile in application and reliable in measurement, but is adapted to measure relative movements of rock formations between any point along a borehole, irrespective of the direction in which the borehole extends, and the mouth of the borehole, or another point in the borehole. The apparatus is adaptable to measure dynamic, static, creep or transient effects, as well as temperature effects, with a single gage, which may either by read directly or remotely. The gage may be installed prior to any substantial change in the initial state of stress and is therefore applicable to the measurement of the internal state of stress and also the in situ elastic properties or the rock. When connected to an appropriate electrical circuit, the apparatus can record the passage of a transient stress wave at two separate points a known distance apart, so that the velocity of the wave, changes in shock velocity, changes in velocity of ground movement, as well as changes in wave form, amplitude or frequency of vibration may be recorded. Since the apparatus may be installed at any inclination upwardly or downwardly, it is possible to use a combination of gages at suitable angles to each other to differentiate between the effects due to longitudinal, vertical, transverse, and surface waves, or to differentiate between static effects due to variations in rock properties, in crystal orientation, geology, stratigraphy, or other structural differences. When a single anchor means is utilized, the same rod, tube or connecting means, which transmits changes in position of the anchor means to the gage means, may be utilized to effectuate anchoring of the anchor means. Preferably, a hollow, perforate anchor means is utilized, in which a suitable adhesive is used, so that the connecting means provides an accurate measurement of the location and a positive disposition of the anchor means at a desired location. When the changes in distance between two points in the borehole are to be measured, only three concentric, tubular members are necessary, since the inner member, which also may be a rod, is utilizable to connect the innermost anchor with the gage means, while the outermost may be utilized to transmit changes in location and the like from the anchor means closer to the gage means. When the gage housing is disposed completely within the borehole, it is protected against flying rock, debris and shock waves, so that effects produced by blasting at points close to the gage housing may be measured. When the borehole extends upwardly, a packer for holding the outer connecting means enables the anchor means to be accurately positioned and the inner rod to be moved, to effect anchorage of the anchor means with difficulty. When the borehole extends downwardly, an expandable protector prevents rocks and other debris from damaging the gage or gage housing, while a detachable connection between the inner rod and the anchor means permits the concentric connecting means to be lowered with ease and facility. When the compaction of compactible earth material is to be measured, a shallow borehole only in the bedrock beneath provides a place for the anchor means, while a laterally extending web means at the gage housing permits the housing to settle with the material being compacted, further to insure accuracy of measurement.

Although several embodiments of this invention have been described and illustrated, it will be understood that other embodiments may exist and that changes and variations may be made therein, all without departing from the spirit and scope of this invention.

What is claimed is:

1. Apparatus for measuring earth movements between two spaced points along a borehole, including:
    a gage means constructed and arranged for fixed installation at the mouth of said borehole;
    anchor means constructed and arranged for fixed installation at a point within said borehole;
    means disposable within said borehole and extending between said anchor means and said gage means; and
    anchorage producing means disposable within said borehole and adapted for initial movement relative to said extending means for effecting an anchorage of said anchor means, one of said extending means and said anchorage producing means transmitting movement of said anchor mean to said gage means.

2. Apparatus as defined in claim 1, wherein:
    said two spaced points comprise the mouth of said borehole and a point within said borehole;
    said gage means is constructed and arranged for fixed installation in said mouth of said borehole;
    one of said extending means and said anchorage producing means includes a first series of connected members constructed and arranged to extend between said anchor means and said gage means; and
    said other of said extending means and said anchorage producing means includes a second series of connected members constructed and arranged for surrounding said first series of members.

3. Apparatus as defined in claim 1, wherein said anchor means includes:
    a hollow, perforate member initially movable along said borehole and adapted to contain a settable bonding agent for attaching said member to the wall of said borehole at said point within said borehole, said extending means being constructed and arranged for attachment to said member; and
    means for pushing said bonding agent into the space between said member and said borehole, said pushing means being constructed and arranged to be connected to said anchorage producing means.

4. Apparatus as defined in claim 1, wherein:
said gage means includes a gage mounted within a housing; and
said housing is constructed and arranged to be disposed wholly within the mouth of said borehole.

5. Apparatus as defined in claim 1, wherein:
said two points spaced along said borehole are each remote from the mouth of said borehole;
said anchor means is constructed and arranged for fixed installation at the innermost point; and wherein said apparatus further comprises
a second anchor means constructed and arranged for fixed installation at the other of said points; and
an independent connecting means disposable in said borehole and connecting said second anchor means with said gage means for transmitting movement of said second anchor means to said gage means.

6. Apparatus as defined in claim 5, wherein:
said extending means is located in said borehole between said gage means and said second anchor means; and
said independent connecting means is adapted for initial movement relative to said extending means, for effecting an anchorage of said second anchor means.

7. Apparatus as defined in claim 6, wherein:
said anchorage producing means includes a first series of connectable members connected at the inner end thereof to said innermost anchor means and at the outer end to said gage means;
said extending means includes a second series of connectable members adapted to surround said first series of members; and
said independent connecting means includes a third series of connectable members attachable at the inner end thereof to said second anchor means and at the outer end to said gage means and adapted to surround said second series of members.

8. Apparatus as defined in claim 7, wherein:
each said anchor means includes a hollow, perforate member adapted to contain a bonding agent and means for pushing said bonding agent into the space between said member and said borehole;
said pushing means of said innermost anchor means is movable by said first series of members; and
said pushing means of said second anchor means is movable by said third series of members.

9. Apparatus as defined in claim 1, adapted for use in a borehole which extends upwardly and including:
packing means connected to said extending means for holding said extending means in said borehole, while said anchorage producing means is being moved to effect an anchorage of said anchor means.

10. Apparatus as defined in claim 1, including:
means for releasably attaching said anchorage producing means to said anchor means.

11. Apparatus as defined in claim 4, adapted for use in a borehole which extends downwardly and including:
expandible means disposed wholly within the mouth of said borehole above said gage housing and preventing damage to said housing or gage by rock or the like entering the said borehole mouth.

References Cited

UNITED STATES PATENTS

| | | |
|---|---|---|
| 2,457,558 | 12/1948 | Hornfeck. |
| 3,276,123 | 10/1966 | Huggenberger _________ 33—1 |

FOREIGN PATENTS

| | | |
|---|---|---|
| 990,393 | 7/1949 | France. |
| 645,833 | 11/1950 | Great Britain. |
| 165,316 | 1/1965 | U.S.S.R. |

OTHER REFERENCES

Colorado School of Mines Quarterly, vol. 52, No. 3, July 1957; pages 174–176 relied on.

ROBERT B. HULL, *Primary Examiner.*